United States Patent
Schumacher et al.

(10) Patent No.: US 10,486,630 B2
(45) Date of Patent: Nov. 26, 2019

(54) INTEGRATED CIRCUIT IN A CONTROL UNIT, AND A CONTROL UNIT FOR ACTIVATING A PASSENGER PROTECTION ARRANGEMENT

(71) Applicant: Robert Bosch GmbH, Stuttgart (DE)

(72) Inventors: Hartmut Schumacher, Freiberg (DE); Bernd Roos, Flein (DE); Rüdiger Karner, Kornwestheim (DE); Alain Jousse, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 15/368,071

(22) Filed: Dec. 2, 2016

(65) Prior Publication Data
US 2017/0080888 A1  Mar. 23, 2017

Related U.S. Application Data

(63) Continuation of application No. 11/666,842, filed as application No. PCT/EP2005/054483 on Sep. 9, 2005, now abandoned.

(30) Foreign Application Priority Data

Nov. 23, 2004 (DE) .................. 10 2004 056 415

(51) Int. Cl.
*B60R 21/0132* (2006.01)
*B60R 21/017* (2006.01)
*B60R 21/013* (2006.01)
*B60R 21/01* (2006.01)

(52) U.S. Cl.
CPC ........ *B60R 21/0132* (2013.01); *B60R 21/013* (2013.01); *B60R 21/017* (2013.01); *B60R 2021/01068* (2013.01); *B60R 2021/01286* (2013.01)

(58) Field of Classification Search
CPC ........... B60R 2021/01068; B60R 2021/01286; B60R 21/013; B60R 21/0132; B60R 21/017
See application file for complete search history.

(56) References Cited

U.S. PATENT DOCUMENTS

| | | | |
|---|---|---|---|
| 5,503,059 A | 4/1996 | Pacholok | |
| 5,648,759 A * | 7/1997 | Miller | B60T 8/404 340/660 |
| 5,691,629 A | 11/1997 | Belnap | |
| 5,717,318 A | 2/1998 | Matsuda et al. | |

(Continued)

FOREIGN PATENT DOCUMENTS

| | | |
|---|---|---|
| DE | 198 25 817 | 9/1999 |
| DE | 100 57 915 | 5/2002 |

(Continued)

*Primary Examiner* — Thienvu V Tran
*Assistant Examiner* — Nicolas Bellido
(74) *Attorney, Agent, or Firm* — Norton Rose Fulbright US LLP; Gerard Messina

(57) ABSTRACT

An integrated circuit having a housing in a control unit provides at least two voltage levels, has a watchdog for monitoring a processor, performs an evaluation of at least one acceleration signal to enable at least one ignition output stage, and has at least one first interface for connecting to at least one sensor situated outside the control unit.

22 Claims, 1 Drawing Sheet

(56) References Cited

U.S. PATENT DOCUMENTS

| | | | |
|---|---|---|---|
| 5,802,480 A * | 9/1998 | Shiraishi | B60R 21/01 |
| | | | 180/282 |
| 5,904,666 A | 5/1999 | DeDecker et al. | |
| 6,191,949 B1 | 2/2001 | Hansen et al. | |
| 6,218,738 B1 * | 4/2001 | Fujishima | B60R 21/017 |
| | | | 280/735 |
| 6,249,228 B1 | 6/2001 | Shirk et al. | |
| 6,530,597 B1 | 3/2003 | Nesper et al. | |
| 6,803,673 B2 | 10/2004 | Otterbach et al. | |
| 7,137,645 B2 | 11/2006 | Schumacher et al. | |
| 7,185,449 B2 | 3/2007 | Kime | |
| 7,225,369 B2 | 5/2007 | Schumacher et al. | |
| 7,263,421 B2 * | 8/2007 | Schou | B60R 21/017 |
| | | | 280/735 |
| 2003/0155753 A1 | 8/2003 | Breed | |
| 2004/0094349 A1 * | 5/2004 | Schumacher | B60R 21/013 |
| | | | 180/274 |

FOREIGN PATENT DOCUMENTS

| | | |
|---|---|---|
| JP | 2003252168 | 9/2003 |
| JP | 2004284376 | 10/2004 |

* cited by examiner

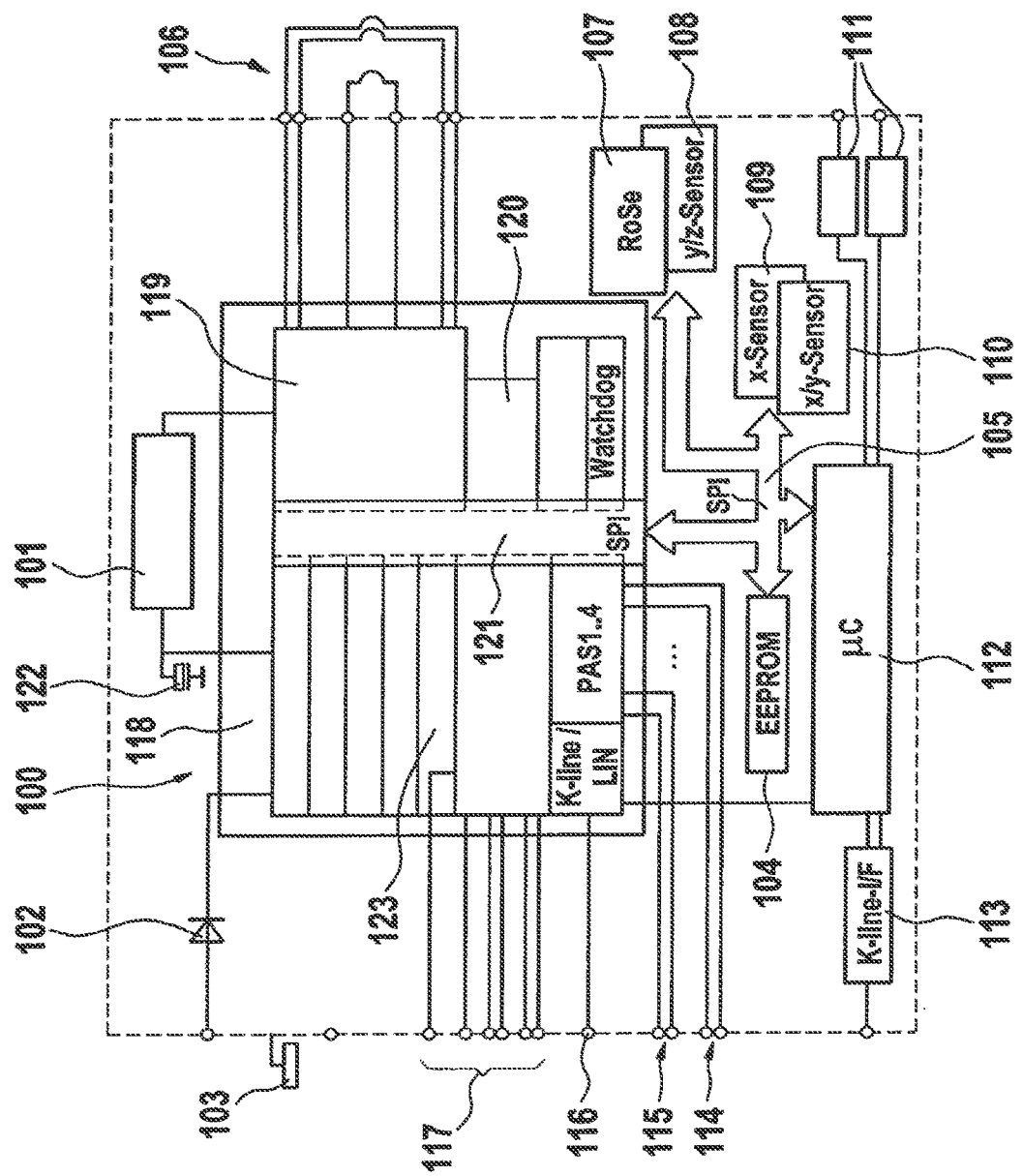

INTEGRATED CIRCUIT IN A CONTROL UNIT, AND A CONTROL UNIT FOR ACTIVATING A PASSENGER PROTECTION ARRANGEMENT

CROSS-REFERENCE TO RELATED APPLICATIONS

The present application is a continuation application of U.S. patent application Ser. No. 11/666,842, filed on Oct. 29, 2007, which is a national phase of International Patent Application No. PCT/EP2005/054483, filed Sep. 9, 2005, and claims priority to German Patent Application No. DE 10 2004 056 415.9, filed on Nov. 23, 2004, all of which are hereby incorporated by reference in their entireties in the accompanying patent application.

BACKGROUND OF THE INVENTION

1. Field of the Invention

The present invention relates to an integrated circuit having a housing in a control unit.

2. Description of Related Art

A control unit for activating passenger protection means, in which a processor is provided in and a security IC is provided parallel thereto, which monitors sensor values independently of the processor, is described in published German patent document DE 100 57 915. An ignition circuit component having ignition output stages for activating the ignition element is also provided.

A BRIEF SUMMARY OF THE INVENTION

The integrated circuit according to the present invention, having a housing in a control unit, has the advantage over the related art that different functions are now situated in a single component within a housing. These functions include the power supply unit, a watchdog for monitoring the processor of the control unit, a function for independent monitoring of the sensor values to release the ignition output stages as a function thereof, and interfaces for connecting at least one sensor situated outside the control unit. This integrated component therefore represents a very compact, cost-effective, and reliable achievement of the object of integrating all of these functions into one component. Therefore, the electronics material costs and the required circuit board area are reduced. By reducing the required number of elements, a reduction of the overall breakdown rate of the control unit is also to be expected.

It is particularly advantageous that the integrated circuit additionally has a further interface for communication with sensors or other control units. This interface may, for example, be implemented as a CAN bus interface or as a K line.

In particular, it is advantageous that the watchdog is implemented in three stages. The three-stage watchdog performs system clock monitoring, monitors the correct sequence of system-relevant software-based functions, and monitors built-in self-tests of system components, such as memory components or other internal processor components.

In addition, it is advantageous that the power supply unit additionally has the function of charging an energy reserve of the control unit which is required for the autonomous time.

The power supply unit also has a DC voltage converter for an increased voltage for the energy reserve, a step-down converter for a 6.7 V power supply unit, and components for the 5 V and 3.3 V power supply unit. Linear voltage regulators may be used here.

In addition, the integrated circuit according to the present invention advantageously has a reset manager. A reset is produced in the event of overvoltage or undervoltage or a watchdog error, and to reset the logic of the control unit processor, such as a microcontroller.

Finally, it is also advantageous that the integrated circuit according to the present invention also contains the ignition output stages. Therefore, multiple elements may be provided using a single integrated circuit.

BRIEF DESCRIPTION OF THE SEVERAL VIEWS OF THE DRAWING

FIG. 1 shows a block diagram of a control unit having the integrated circuit according to the present invention.

DETAILED DESCRIPTION OF THE INVENTION

The electronic functions and functions implemented in software of a control unit for activating passenger protection means, such as airbags, belt tensioners, or pedestrian protection means, are becoming increasingly more intelligent. Different components are offered for this purpose. However, costs are an important factor in automobile electronics, so that a cost reduction is necessary here.

Therefore, the following functions are assembled into a single integrated circuit according to the present invention:

The power supply unit, a security function, and interfaces. In addition, the ignition output stages may also be integrated into the integrated circuit. The security function includes a watchdog for the processor located in the control unit, preferably a microcontroller, and an evaluation of the acceleration signals independently of the microcontroller. This refers to the security semiconductor known from the related art. The functions also include interfaces to the external sensors and also other communication interfaces, such as the K line or CAN. The unidirectional connections to the sensors are possible, such as a bus interface and the LIN interface.

FIG. 1 shows a block diagram of the integrated circuit according to the present invention, which is situated in a control unit. The dashed boundary line indicates the control unit. Integrated circuit 100, to which the cathode of a diode 102 is connected, is located inside the control unit. This connection of the cathode of diode 102 leads to a block 118 in circuit 100, which is responsible for the power supply. This block 118 performs the following functions: it has a step-output or step-down converter for the energy reserve, it has a voltage converter to achieve 3.3 V from the existing 5 V, and it has a voltage regulator for this 3.3 V.

In addition, block 118 has a reset function to restart the control unit in case of an error, for example. Block 118 is additionally connected to a regulator 101, to which energy reserve 122 is connected as a capacitor in relation to ground. Regulator 101 ensures charging of energy reserve 122 and, in case of triggering, supplying the energy stored in the energy reserve 122 to a block 119, which represents the ignition output stages. The ignition current is typically always obtained from energy reserve 122. Alternatively, it is possible to provide ignition output stages 119 outside component 100. However, block 119 is also supplied internally with energy from block 118 to operate the logic provided in block 119, for example.

An SPI (serial peripheral interface) bus 121, which allows data communication, is provided internally between blocks 119 and 118, 123 and 120. An SPI bus 105 is also connected to this SPI bus 121, outside the component 100. Not only a memory 104, which is implemented here as an EEPROM, but also microcontroller 112 and sensors 107 through 110, are connected to this bus 105. Inside integrated circuit 100, block 120 performs the security functions, which include the parallel analysis of the sensor signals from sensors 107 through 110, this analysis occurring in parallel to that of microcontroller 112, and the watchdog function, which monitors the function of microcontroller 112. These functions are all executed via SPI buses 121 and 105. In particular, the watchdog performs the system clock monitoring, the monitoring of the correct sequence of the system-relevant software-based functions, and the monitoring of built-in self-tests of system components, such as memory components 104. The watchdog may thus be implemented as a three-fold watchdog, since it performs three functions in parallel here. Block 123 represents the interface functions of integrated circuit 100. Block 123 is therefore connected via inputs/outputs 117 to the outside world of the control unit. In particular, block 123 is connected via a K line or LIN interface via input/output 116 to the outside world, for example, to weight sensors on a vehicle seat. Block 123 is connected via inputs/outputs 115 to externally connected acceleration sensors, which are located in the vehicle side and/or the vehicle front as front sensors, for example. Sensor signals of these external sensors are analyzed by the safety controller of block 120 in parallel to microcontroller 112 in order to establish whether it is actually a case for triggering.

Microcontroller μC determines, on the basis of the sensor data of sensors 107 through 110 and the external sensors, which provide their data via inputs 115 and 114 to block 100, whether the triggering of restraining means is necessary. Since microcontrollers such as microcontroller 112 may have malfunctions under certain circumstances and incorrect triggering may occur, it is necessary to provide redundant analysis, which is implemented by block 120. This analysis by block 120 is less detailed than that which processor 112 performs itself. Data which is required for a post-crash analysis is stored in memory 104, which is implemented as an EEPROM. This data includes, for example, error and operational characteristic values, such as the measured accelerations which have resulted in triggering, triggering times, times of day, etc. As shown in FIG. 1, block 107 is implemented as a roll rate sensor, while sensor 108 senses accelerations in the Y and Z directions. Y means a lateral direction of the vehicle and Z means a vertical direction of the vehicle. The X direction is detected by sensor 109, for example, which detects accelerations in the vehicle longitudinal direction. An X-Y sensor 110 which detects accelerations in the vehicle longitudinal direction and vehicle transverse direction, respectively, is also provided. Angled arrangements of the acceleration sensors are possible, of course. Processor 112 is connected via an interface component 113 via the K line to other control units, for example. K line is an established concept and stands for communication line. Processor 112 is connected to two drivers 111 via an output. Drivers 111 are configured as low side switches, for example, for turning on and off a lamp and producing a digital signal, as a pull-up in the receiver of the signal.

An example operation of the control unit having component 100 according to the present invention is as follows. Energy reserve capacitor 122 is charged by using component 100 via diode 102 and block 118. In addition, block 118 provides the operating voltages for the control unit. These operating voltages include 5 V and also 3.3 V, which are provided in regulated form. The control unit receives sensor values from sensors 107 through 110 and the external sensors via inputs 114 and 115 in order to determine whether a crash condition exists. The sensor values are analyzed by processor 112. The acceleration signals are typically smoothed or integrated and compared to variable or fixed thresholds. In parallel to this, block 120 also uses a safety controller to monitor these sensor values via fixed thresholds, for example, to determine whether a case for triggering may actually occur. This redundancy ensures that malfunctions of microcontroller 112 are recognized. Such malfunctions are also continuously monitored by a watchdog functionality of block 120, however. In addition to the system clock monitoring, these watchdog functions also include the monitoring of the software-based functions of microcontroller 112, in that specific questions are put to the microcontroller to establish, on the basis of the results, whether the microcontroller is still capable of correctly answering these questions. A further function of the watchdog is the monitoring of built-in self-tests of system components, such as memory components or other internal processor components. Block 123 thus ensures the supply of external sensor data, but other external data may also be detected via inputs/outputs 117.

If a case for triggering is established by microcontroller 112 and verified by block 120, output stages 119 are enabled by block 120 and the fire command is transmitted from processor 112 via SPI line 105 and 121 to output stages 119, so that these are then enabled. This causes the energy which is stored in energy reserve 122 to be supplied via block 101 to the output stages, which supply the energy to ignition elements 106, so that the ignition elements are fired, and in turn the restraining means are triggered.

In addition to the components shown here, further components may be situated in the control unit.

What is claimed is:

1. A control unit for activating a passenger protection arrangement, comprising:
    at least one first interface for connecting to at least one sensor providing at least one acceleration signal situated outside the control unit;
    a processor, wherein the processor performs a first evaluation of the at least one acceleration signal; and
    an integrated circuit with a single housing, wherein the integrated circuit provides at least two voltage levels and wherein the integrated circuit performs a second evaluation of the at least one acceleration signal, the integrated circuit including:
        a watchdog for monitoring the processor;
        multiple blocks, wherein a first of the multiple blocks includes a reset function to restart the control unit, wherein a second of the multiple blocks performs a safety function to which the watchdog and the second evaluation in parallel to the first evaluation by the processor belong, wherein a third of the multiple blocks includes at least one ignition output stage for activating the passenger protection arrangement as a function of the first evaluation and the safety function, and wherein a fourth of the multiple blocks comprising the at least one first interface; and
        a first Serial Peripheral Interface (SPI) bus to enable data communication between the multiple blocks of the integrated circuit.

2. The control unit of claim 1, wherein the at least one first interface is implemented as a Controller Area Network (CAN) bus or as a K line.

3. The control unit of claim 1, wherein the integrated circuit includes a power supply unit for providing the at least two voltage levels.

4. The control unit of claim 3, wherein the power supply unit includes at least one converter.

5. The control unit of claim 4, further comprising:
an energy reserve capacitor;
wherein the power supply unit includes a voltage regulator, wherein the voltage regulator is coupled to the converter, and wherein the voltage regulator is adapted to charge the energy reserve capacitor with an output of the converter.

6. The control unit of claim 1, wherein the watchdog includes three stages, and wherein the three-stage watchdog monitors a system time clock, a correct sequence of system relevant software-based functions, and built-in self-tests of system components.

7. The control unit of claim 1, wherein the reset function is performed in events, and wherein the events include an overvoltage, an undervoltage, a watchdog error, and a reset of a logic of the processor.

8. The control unit of claim 1, further comprising:
at least one second interface for connecting to at least one of an additional sensor and an additional control unit.

9. An integrated circuit consisting of a single component in a single housing in a control unit for activating a passenger protection arrangement, comprising:
a watchdog for monitoring a processor; and
at least one first interface for connecting to at least one sensor providing at least one acceleration signal situated outside the control unit;
wherein the integrated circuit provides at least two voltage levels and performs, via a processor, an evaluation of the at least one acceleration signal derived from the at least one sensor to enable at least one ignition output stage,
wherein the integrated circuit includes the single component in the single housing in the control unit, and
wherein the integrated circuit includes multiple blocks, wherein a first of the multiple blocks includes a reset function to restart the control unit, wherein a second of the multiple blocks performs a safety function to which the watchdog and the second evaluation in parallel to the first evaluation by the processor belong, wherein a third of the multiple blocks includes at least one ignition output stage for activating the passenger protection arrangement as a function of the first evaluation and the safety function, and wherein a fourth of the multiple blocks comprising the at least one first interface; and
wherein the integrated circuit includes an interface bus to enable data communication between the multiple blocks of the integrated circuit.

10. The integrated circuit of claim 9, further comprising:
at least one second interface for connecting to at least one of an additional sensor and an additional control unit.

11. The integrated circuit of claim 9, wherein the watchdog includes three stages.

12. The integrated circuit of claim 9, wherein the integrated circuit implements charging of an energy reserve.

13. The integrated circuit of claim 9, wherein the integrated circuit implements reset management.

14. The integrated circuit of claim 9, wherein the at least one ignition output stage is part of the integrated circuit.

15. The integrated circuit of claim 10, wherein the watchdog includes three stages.

16. The integrated circuit of claim 10, wherein the integrated circuit implements charging of an energy reserve.

17. The integrated circuit of claim 10, wherein the integrated circuit implements reset management.

18. The integrated circuit of claim 10, wherein the at least one ignition output stage is part of the integrated circuit.

19. The integrated circuit of claim 15, wherein the integrated circuit implements charging of an energy reserve.

20. The integrated circuit of claim 15, wherein the integrated circuit implements reset management.

21. The integrated circuit of claim 15, wherein the at least one ignition output stage is part of the integrated circuit.

22. The control unit of claim 3, wherein the power supply unit includes at least one converter, the at least one converter including at least one of a step-up converter and a step-down converter.

* * * * *